(12) United States Patent
Caber

(10) Patent No.: US 7,236,121 B2
(45) Date of Patent: Jun. 26, 2007

(54) PATTERN CLASSIFIER AND METHOD FOR ASSOCIATING TRACKS FROM DIFFERENT SENSORS

(75) Inventor: Timothy E. Caber, Tucson, AZ (US)

(73) Assignee: Raytheon Company, Tucson, AZ (US)

( * ) Notice: Subject to any disclaimer, the term of this patent is extended or adjusted under 35 U.S.C. 154(b) by 241 days.

(21) Appl. No.: 11/151,825

(22) Filed: Jun. 13, 2005

(65) Prior Publication Data

US 2006/0279453 A1 Dec. 14, 2006

(51) Int. Cl.
- *G01S 13/00* (2006.01)
- *F41G 7/00* (2006.01)
- *F41G 9/00* (2006.01)

(52) U.S. Cl. .................. 342/62; 342/90; 244/3.15; 701/302

(58) Field of Classification Search ............ 342/62–63, 342/90; 244/3.1, 3.11, 3.13–3.19; 701/302
See application file for complete search history.

(56) References Cited

U.S. PATENT DOCUMENTS

| | | | | |
|---|---|---|---|---|
| 4,881,270 A | * | 11/1989 | Knecht et al. .............. | 382/191 |
| 5,128,684 A | * | 7/1992 | Brown ........................ | 342/189 |
| 5,340,056 A | * | 8/1994 | Guelman et al. ........... | 244/3.16 |
| 5,341,142 A | * | 8/1994 | Reis et al. .................... | 342/64 |
| 5,341,143 A | * | 8/1994 | Reis et al. .................... | 342/64 |
| 5,414,643 A | * | 5/1995 | Blackman et al. ............ | 342/95 |
| 5,458,041 A | * | 10/1995 | Sun et al. .................... | 89/1.11 |
| 5,798,942 A | * | 8/1998 | Danchick et al. ............. | 342/96 |
| 6,005,610 A | * | 12/1999 | Pingali ........................ | 348/169 |
| 6,085,151 A | * | 7/2000 | Farmer et al. ............... | 701/301 |
| 6,196,496 B1 | * | 3/2001 | Moskovitz et al. .......... | 244/3.15 |
| 6,263,088 B1 | * | 7/2001 | Crabtree et al. ............ | 382/103 |
| 6,278,401 B1 | * | 8/2001 | Wigren ........................ | 342/195 |
| 6,278,918 B1 | * | 8/2001 | Dickson et al. ............... | 701/23 |
| 6,295,367 B1 | * | 9/2001 | Crabtree et al. ............ | 382/103 |
| 6,347,763 B1 | * | 2/2002 | Harkins et al. ............. | 244/3.21 |
| 6,564,146 B1 | * | 5/2003 | Meyer et al. ................ | 701/213 |
| 6,877,691 B2 | * | 4/2005 | DeFlumere et al. ........ | 244/3.16 |
| 6,898,528 B2 | * | 5/2005 | Zorka et al. ................. | 701/301 |
| 6,952,001 B2 | * | 10/2005 | McKendree et al. ......... | 244/3.1 |
| 7,032,858 B2 | * | 4/2006 | Williams .................... | 244/3.15 |
| 7,193,557 B1 | * | 3/2007 | Kovacich et al. ............. | 342/89 |
| 2003/0235327 A1 | * | 12/2003 | Srinivasa .................... | 382/104 |

(Continued)

*Primary Examiner*—Thomas H. Tarcza
*Assistant Examiner*—Shelley Chen
(74) *Attorney, Agent, or Firm*—Gregory J. Gorrie; Schwegman, Lundberg, Woessner & Kluth, P.A.

(57) ABSTRACT

An interceptor-based sensor clusters tracks of objects to generate track clusters based on an uncertainty associated with each track, and generates feature vectors for a cluster under test using the relative placement and the population of other track clusters. The feature vectors may include one or more of a cluster count feature vector (N), a cluster population density feature vector (P), a cluster proximity feature vector (r), a cluster-weighted centroid feature vector (L) and a cluster scattering feature vector (θ). The interceptor-based sensor generates belief functions (μ) from corresponding feature vectors of clusters of tracks generated from a ground-based sensor and the interceptor-based sensor. The interceptor-based sensor may also associate the tracks with a cluster having a track of interest identified by a ground-based sensor based on the belief functions and may select one of the tracks for intercept of a corresponding object within the threat object cloud.

32 Claims, 17 Drawing Sheets

U.S. PATENT DOCUMENTS

2004/0004155 A1* 1/2004 DeFlumere et al. ....... 244/3.11
2004/0068416 A1* 4/2004 Solomon ....................... 705/1
2005/0031165 A1* 2/2005 Olson et al. ................. 382/103
2006/0279453 A1* 12/2006 Caber .......................... 342/97

* cited by examiner

CLUSTER PROXIMITY(r)

CLUSTER SCATTERING

CLUSTER BELIEF FUNCTIONS BETWEEN FEATURES

| FEATURE | VALUE | CORRELATION PROPERTY EMULATED | CONTRIBUTION TO LIKELIHOOD |
|---|---|---|---|
| P | 1 | N/A | N |
| r | 1 | N/A | N |
| N | N | # OF OBJECTS | Y |
| L | $\sum_i d_i / (N*D)$ | RADIAL DISTRIBUTION OF OBJECTS | Y |
| Θ | $\sum_i |\theta|_i / (N*\pi/4)$ | ANGULAR DISTRIBUTION OF OBJECTS | Y |

...THESE FEATURES COMPRISE A SUMMARY OF THE CORRELATION FUNCTION

CORRELATION

FIG. 12

PATTERN CLASSIFIER AND METHOD FOR ASSOCIATING TRACKS FROM DIFFERENT SENSORS

TECHNICAL FIELD

Some embodiments of the present invention pertain to pattern classifiers, some embodiments of the present invention pertain to interceptors, some embodiments of the present invention pertain to missile defense systems, and some embodiments of the present invention pertain to methods for associating tracks generated from different sensors.

BACKGROUND

One difficulty with many conventional pattern classification techniques is the association of tracks of objects from different sensors due to scene bias and/or scene mismatch. For example, in the case of intercepting enemy missiles, such as intercontinental ballistic missiles (ICBMs) or other long range missiles, an interceptor-based sensor may need to associate tracks of objects it has generated with tracks of objects generated by a ground-based sensor to determine which object is designated for intercept.

Thus, there are general needs for improved pattern-classification techniques, including improved interceptor-based sensors that can associate tracks of different sensors.

SUMMARY

An interceptor-based sensor clusters tracks of objects to generate track clusters based on an uncertainty associated with each track, and generates feature vectors for the track clusters in each of several predetermined directions with respect to a cluster under test. The feature vectors may include one or more of a cluster count feature vector (N), a cluster population density feature vector (P), a cluster proximity feature vector (r), a cluster-weighted centroid feature vector (L) and a cluster scattering feature vector ($\theta$). The interceptor-based sensor generates belief functions ($\mu$) from corresponding feature vectors of clusters of tracks generated from a ground-based sensor and the interceptor-based sensor. The interceptor-based sensor may also associate the tracks with a cluster having a track of interest identified by a ground-based sensor based on the belief functions and may select one of the tracks for intercept of a corresponding object within the threat object cloud.

BRIEF DESCRIPTION OF THE DRAWINGS

FIG. 12 illustrates the contribution of feature vectors to a correlation function in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
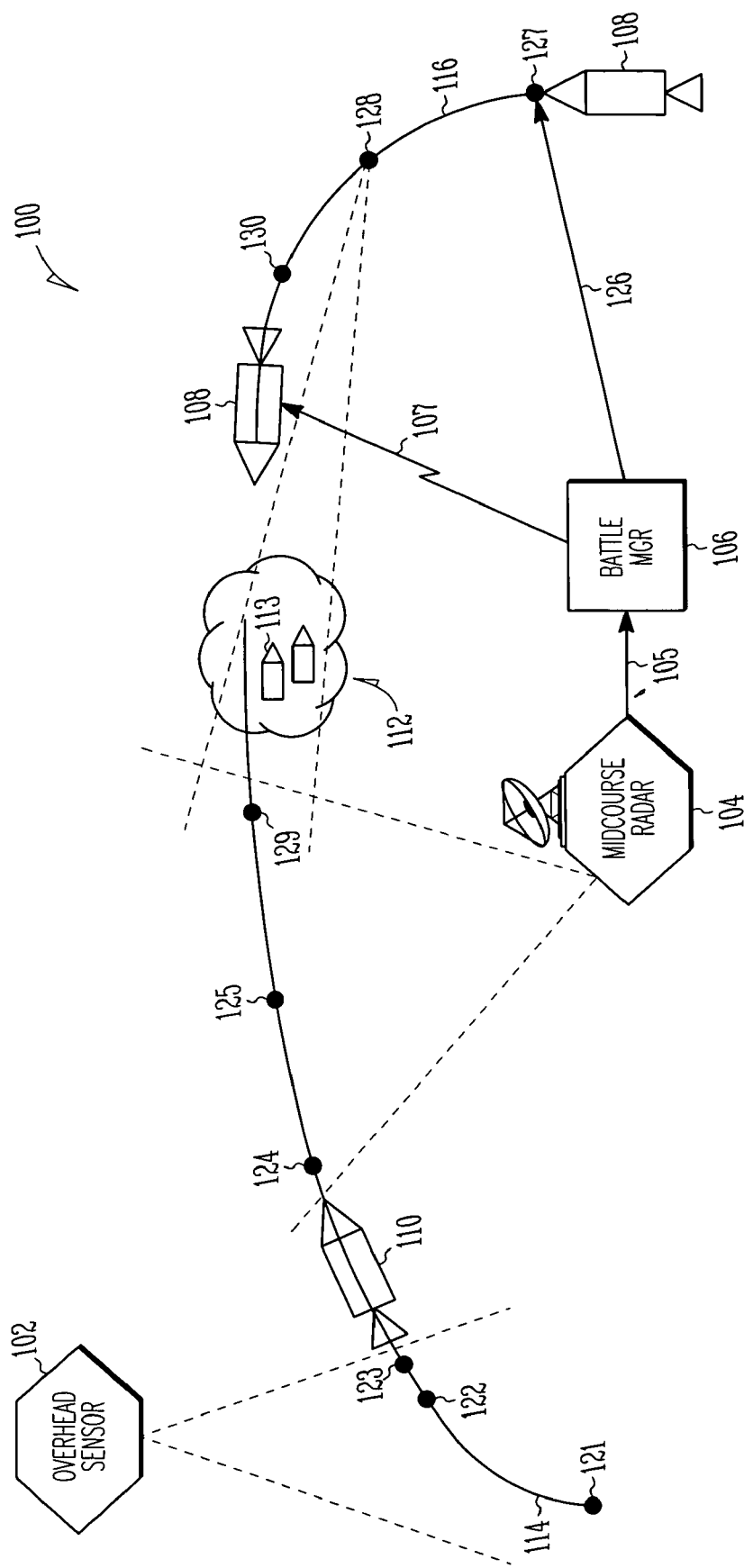
FIG. 1 illustrates an operational environment of a missile-defense system in accordance with some embodiments of the present invention.

FIG. 1 illustrates an operational environment of missile-defense system in accordance with some embodiments of the present invention. System 100 includes overhead sensor 102 to detect a launch of missile 110 and to track missile 110 until final rocket motor burnout. Overhead sensor 102 may be a satellite and missile 110 may be any missile including hostile intercontinental ballistic missiles (ICBMs) and other long-range missiles. Missile 110 may include one or more warheads and one or more decoys. Missile 110 may be launched at time 121, may be detected by overhead sensor 102 at time 122 and may follow path 114.

Overhead sensor 102 may generate a track-state estimate and covariance for missile 110 and may provide the track-state estimate and covariance to ground-based tracking sensor 104 at time 123 (e.g., a cue for acquisition). Ground-based tracking sensor 104 may be a midcourse radar and may establish a search fence to acquire missile 110. In some cases, before acquisition by ground-based tracking sensor 104, missile 110 may deploy its warhead and countermeasures which may include decoys resulting in a threat complex, such as threat object cloud 112 comprising objects 113. Once threat cloud 112 is acquired by ground-based tracking sensor 104 at time 124, ground-based tracking sensor 104 may continue tracking threat cloud 112 to discriminate the warhead from the other objects within the threat cloud 112. In some embodiments, ground-based tracking sensor 104 may designate one object for intercept, which may be referred to as the object or interest corresponding to a track-of-interest (TOI).

In some embodiments, the acquisition process performed by ground-based tracking sensor 104 may include signal conditioning of the received radar returns, creation of individual detection reports by processing the conditioned signals, and track management and state estimation. The track states may be transformed from a sensor-centric coordinate system to an inertial earth-referenced coordinate system using calibrated radar alignment data and the local ephemeris time, which may be referred to as threat track states, although the scope of the invention is not limited in this respect. Threat track states 126 may be coordinated by battle manager 106 and may be used to cue an interceptor launch.

Interceptor 108 may be provided the positional and velocity information from threat track state 126, may be launched at time 127 and may follow path 116. Ground-based tracking sensor 104 may continue to update its track state estimates as interceptor 108 performs its fly out, and updates may be sent over uplink 107 to interceptor 108 to aid in acquisition of threat cloud 112. Interceptor 108 may employ its own signal conditioning, detecting and tracking techniques to acquire threat cloud 112 during time 128, and may establish track state estimates in both a sensor-centric coordinate system and an inertial coordinate system. Interceptor 108 may be any moving sensor and may be part of a missile, aircraft, ground vehicle or other type of moving platform. In some embodiments, a best-radar track of threat cloud 112 from time 129 may be uplinked to interceptor 108. In some embodiments, interceptor 108 may use passive sensors, such as optical and infrared sensors, and may be a bearings-only tracker which may provide good angular state estimates, but not necessarily good range estimates, although the scope of the invention is not limited in this respect.

Once stable state estimates are established by interceptor after time 128, interceptor 108 may compare its on-board tracks with tracks received via uplink 107 by ground-based tracking sensor 104. An unambiguous association of the track of interest from ground-based tracking sensor 104 with the corresponding interceptor track may be determined, for example, after time 130, which may help ensure a successful target interception. Details of the acquisition process are described in more detail below.

In accordance with some embodiments of the present invention, interceptor 108 may perform an association process that may propagate the states and covariances of the radar tracks in inertial coordinates to the interceptor's current epoch. The states and covariances may be transformed to the interceptor's sensor-centric coordinate frame, which may be a two-dimensional angular projection onto the infrared focal plane of detectors. The origin of the coordinate system may be fixed on an inertial pointing reference at some pre-established time. Interceptor 108 may also perform a track-to-track association in an attempt to correlate one of its on-board tracks to the track of interest that is designated by ground-based tracking sensor 104. This is described in more detail below.

Since coordinate transform errors between ground-based tracking sensor 104 and interceptor 108 may exist (e.g.,
atmospheric bending of radar electromagnetic waveforms, uncertainty of the interceptor inertial position given a lack of GPS data, etc.), the track patterns may not necessarily be registered in the local coordinate system. In addition, ground-based tracking sensor 104 and interceptor 108 may not be able to detect all of threat objects 113 or even the same threat objects. Common detection of a warhead is generally a requirement for interceptor 108 to use the data from ground-based tracking sensor 104 and significantly improves the chances of proper target designation. Accordingly, the track-association process should be robust enough to account for the differences in track scene patterns inherent in this environment.

Figure 2A:
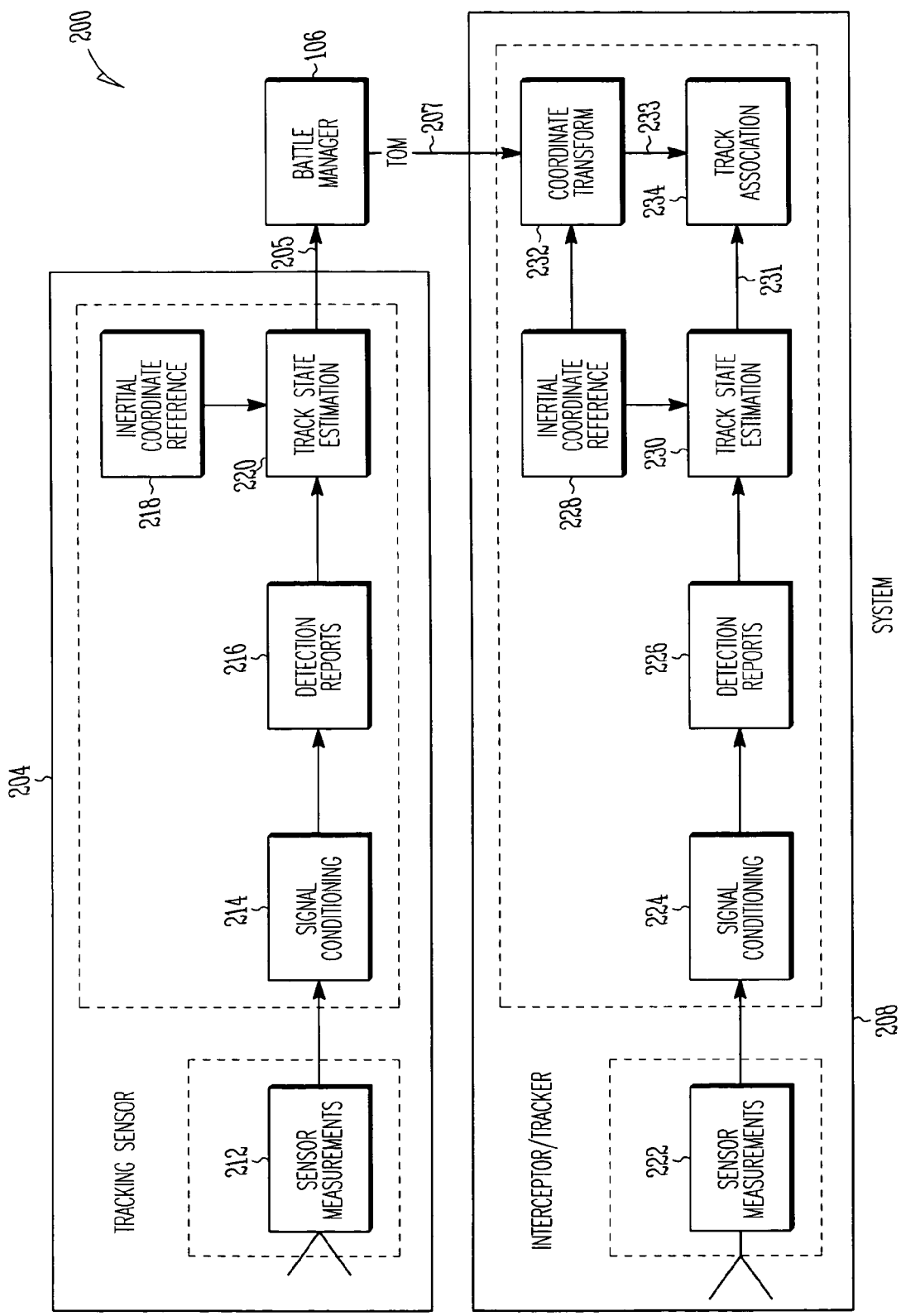
FIG. 2A illustrates functional block diagrams of a ground-based tracking sensor and an interceptor-based sensor in accordance with some embodiments of the present invention.

FIG. 2A illustrates functional block diagrams of a ground-based tracking sensor and an interceptor-based sensor in accordance with some embodiments of the present invention. Ground-based tracking sensor 204 may correspond to ground-based tracking sensor 104 (FIG. 1) and interceptor-based sensor 208 may correspond to interceptor 108 (FIG. 1), although other configurations of ground-based tracking sensors and interceptor-based sensors may also be suitable. Although ground-based tracking sensor 204 and interceptor-based sensor 208 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of ground-based tracking sensor 204 and/or interceptor-based sensor 208 may refer to one or more processes operating on one or more processing elements.

Interceptor-based sensor 208 may comprise sensors 222 to generate image signals based on sensor measurements of a threat cloud. Sensors 222 may be optical/infrared sensors and may include an optical telescope and/or a focal-plane array of charge-coupled devices (CCDs), although the scope of the invention is not limited in this respect. Interceptor-based sensor 208 may also comprise signal conditioning element 224 which may normalize the images and provide thresholding so that only objects exceeding a predetermined threshold are detected. In some embodiments, signal conditioning element 224 may provide a map or a list of locations (e.g., similar to a snapshot) to detection report circuitry 226, which may determine which objects will be provided to track-state estimation element 230. Track-state estimation element 230 may estimate track states over time to determine which objects are real objects, and may provide track-state vectors 231 to track association element 234. Inertial coordinate reference 228 may provide current position and pointing information in an inertial coordinate system for use by track-state estimation element 230. Track-state vectors 231 may include a list of tracks for each tracked object including a position, velocity and an uncertainty. The tracked objects (associated with track-state vectors 231) may correspond to objects 113 (FIG. 1) of threat cloud 112 (FIG. 1).

Ground-based tracking sensor 204 may comprise sensors 212, which may be radar sensors, signal conditioning element 214 and detection report circuitry 216 to generate the detection reports for tracked objects 113 (FIG. 1) of threat cloud 112 (FIG. 1). Track-state estimation element 220 may estimate track states over time to determine which objects are real objects, and may generate track-state vectors 205. Track-state vectors 205 may include range information in addition to position, velocity and uncertainty information. Track-state vectors 205 may comprise a multidimensional threat-object map which may be uplinked by battle manager 106 to interceptor-based sensor 208. The track of interest may be identified as one of track-state vectors 205. Interceptor-based sensor 208 may use coordinate transform circuitry 232 to perform a coordinate transform on track-state vectors 205 provided by ground-based tracking sensor 204 using inertial coordinate reference information provided by inertial coordinate reference 228. Track association element 234 may associate tracks based on track-state vectors 231 with a track of interest of track-state vectors 233 to identify the track of interest within track-state vectors 231 for intercept.

Figure 2B:
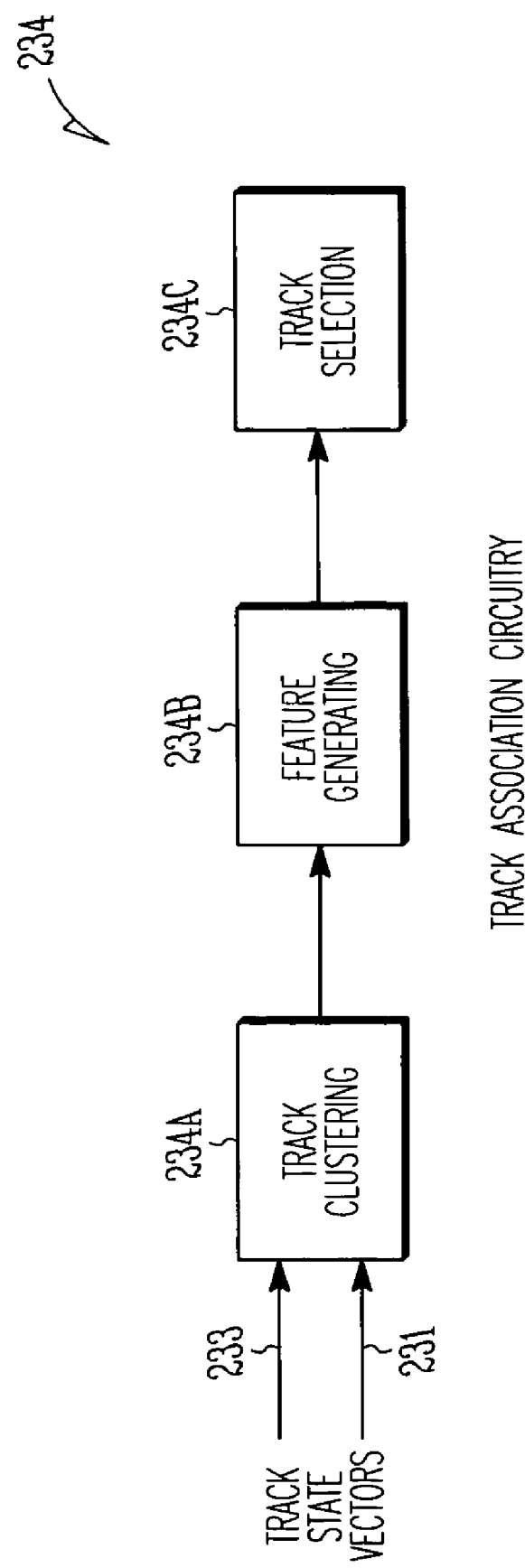
FIG. 2B is a functional block diagram of the track association element of FIG. 2A in accordance with some embodiments of the present invention.

FIG. 2B is a functional block diagram of the track association element 234 of FIG. 2A in accordance with some embodiments of the present invention. Track association element 234 may include track clustering element 234A, feature generating element 234B and track selection element 234C. The operation of track association element 234 is described in more detail below. Although track association element 234 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of track association element 234 may refer to one or more processes operating on one or more processing elements.

Figure 3:
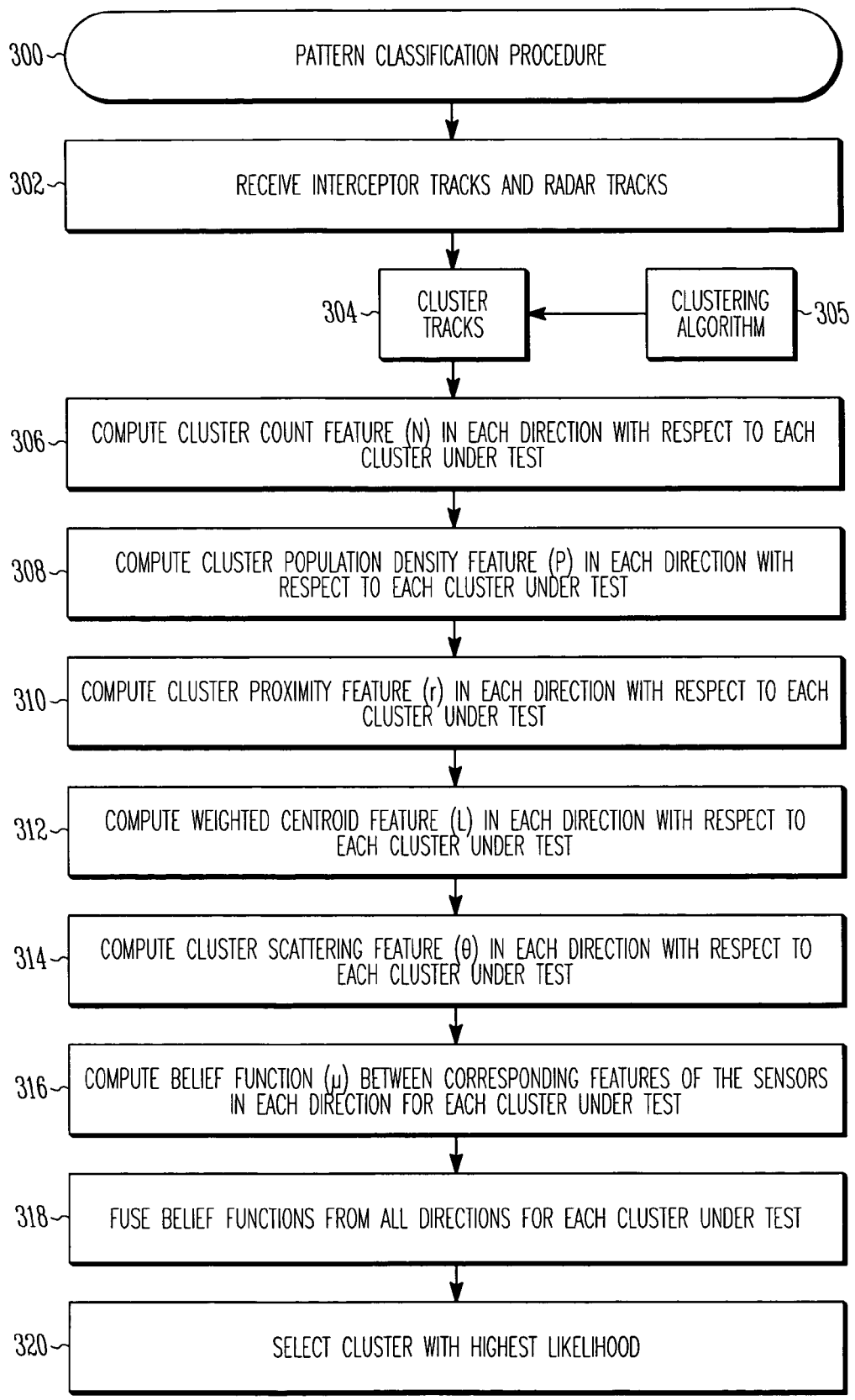
FIG. 3 is a flow chart of a pattern classification procedure in accordance with some embodiments of the present invention.

FIG. 3 is a flow chart of a pattern classification procedure in accordance with some embodiments of the present invention. In some embodiments, the operations of pattern classification procedure 300 may be performed by track association element 234 (FIG. 2A and FIG. 2B), although the scope of the invention is not limited in this respect. In accordance with procedure 300, an interceptor-based sensor may determine which track is the track of interest from track-state vectors generated by its sensors based on a track-of interest designated by a ground-based sensor and track-state vectors provided by the ground-based sensor.

Figure 4:
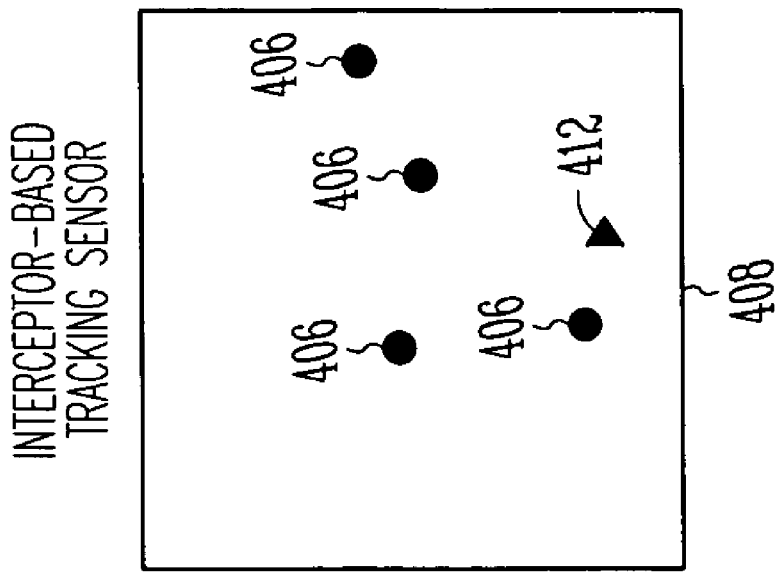
FIG. 4 illustrates examples of tracked objects as seen by different sensors in accordance with some embodiments of the present invention.
Figure 4:
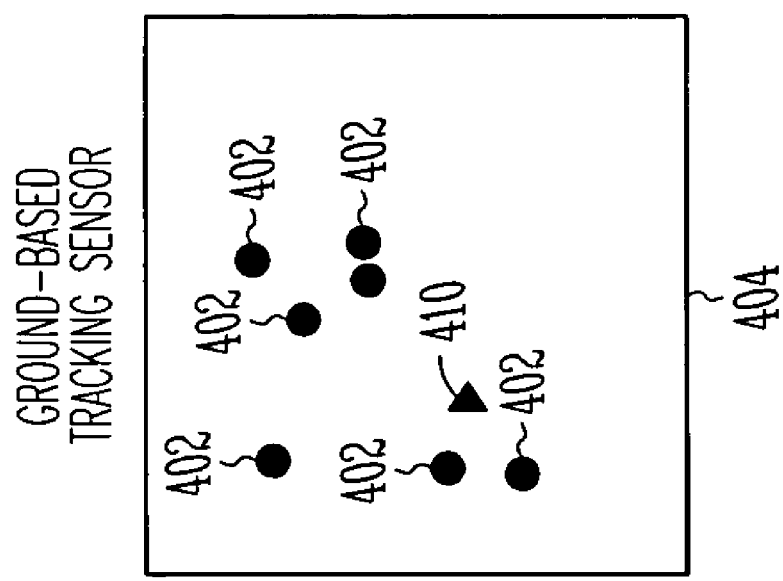

Operation 302 comprises receiving interceptor-based sensor tracks and ground-based sensor tracks. The interceptor-based sensor tracks may be track-state vectors and may correspond to track-state vectors 231 (FIG. 2). The ground-based sensor tracks may be track-state vectors and may correspond to track-state vectors 233 (FIG. 2). Each track-state vector may correspond to a tracked object. In some embodiments, each track-state vector may include position, velocity and uncertainty information. FIG. 4 illustrates examples of tracked objects as seen by different sensors in accordance with some embodiments of the present invention. Objects 402 of scene 404 may be seen by a ground-based sensor and may include object of interest 410. Object of interest 410 may correspond to a designated track of interest provided to the interceptor-based sensor. Objects 406 of scene 408 may be seen by an interceptor-based sensor and may include a corresponding object of interest 412, which may be unknown to the interceptor at this point. In this example illustration, objects 408 and 410 are the same object seen, respectively, by the ground based sensor and the interceptor-based sensor. Common detection of the designated object and/or the designated track by both sensors is essential. In some embodiments, scenes 404 and 408 may correspond to two-dimensional threat object maps, although the scope of the invention is not limited in this respect.

Figure 5:
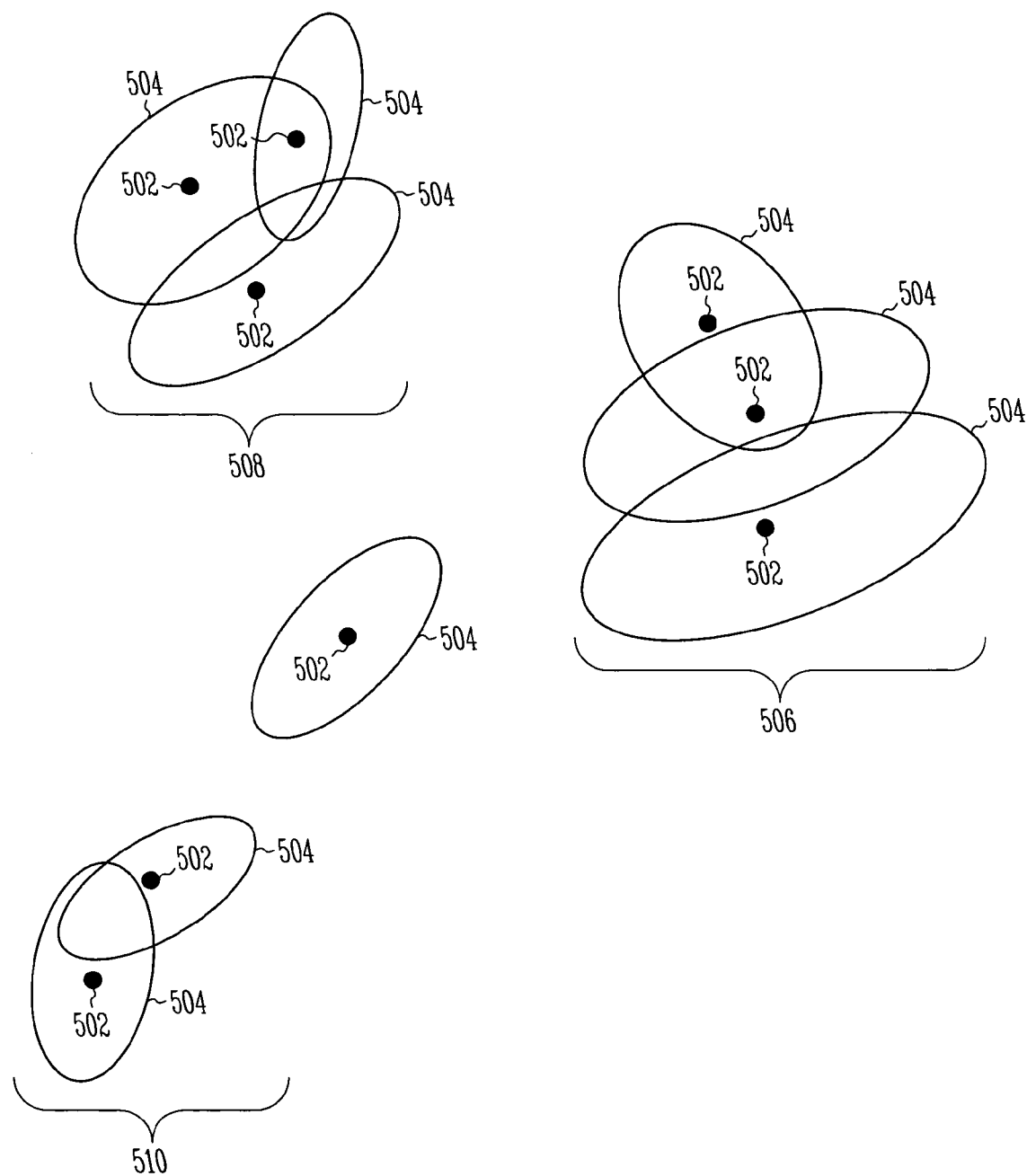
FIG. 5 illustrates clustering of tracks in accordance with some embodiments of the present invention.

Operation 304 comprises clustering the tracks associated with the track-state vectors to generate track clusters. In some embodiments, clustering algorithm 305 may be used. In some embodiments, operation 304 may be performed by track clustering element 234A (FIG. 2B). FIG. 5 illustrates clustering of tracks in accordance with some embodiments of the present invention. As illustrated in FIG. 5, each tracked object 502 may have an uncertainty region associated therewith. The uncertainty region may be referred to as a covariance and may be represented as ellipses 504, although the scope of the invention is not limited in this respect. Operation 304 comprises grouping sensor tracks 502 with overlapping uncertainty regions into a track cluster, such as cluster 506. Operation 304 may be performed for the tracks from each sensor. The most populous clusters, for example, may be more likely to contain tracks detected by both sensors. Clusters 508 and 510 of other tracked objects 502 are also illustrated.

Operations 306 through 314 comprise determining features of the clusters and may be performed in any order. In some embodiments, one or more of operations 306 through 314 may be performed concurrently. In some embodiments, the features determined by one or more of operations 306 through 314 may comprise feature vectors. In some embodiments, less that all of operations 306 through 314 are performed. In some embodiments, operations 306-314 may be performed by feature-generating element 234B (FIG. 2B).

Figure 6A:
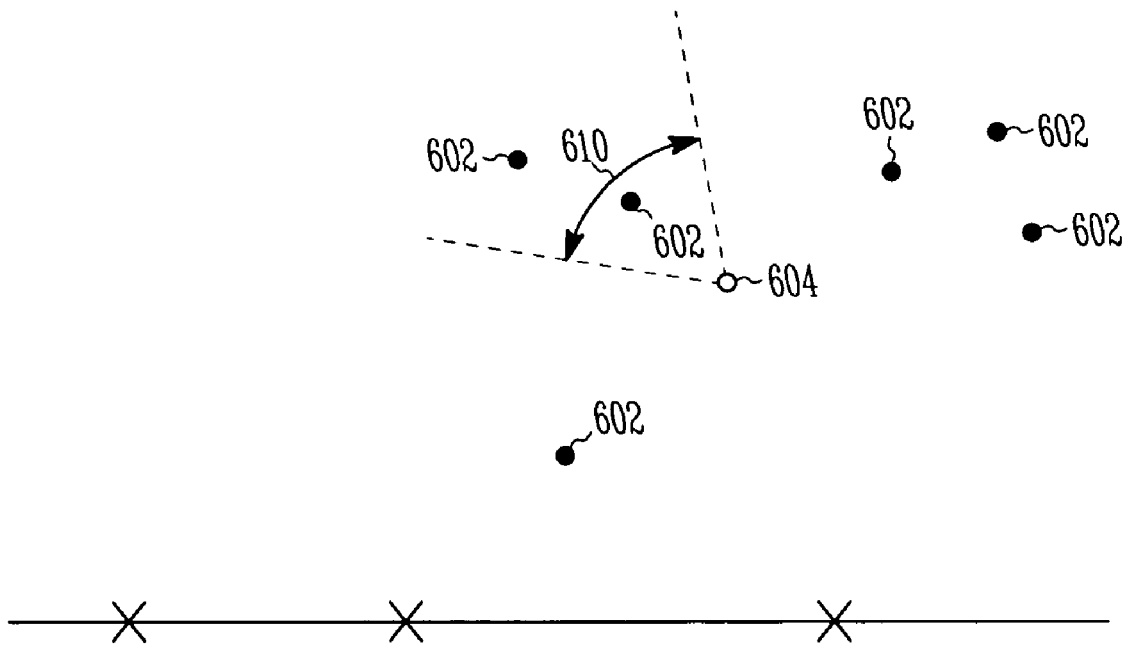
FIG. 6A illustrates a cluster count feature vector (N) in accordance with some embodiments of the present invention.
Figure 6A:
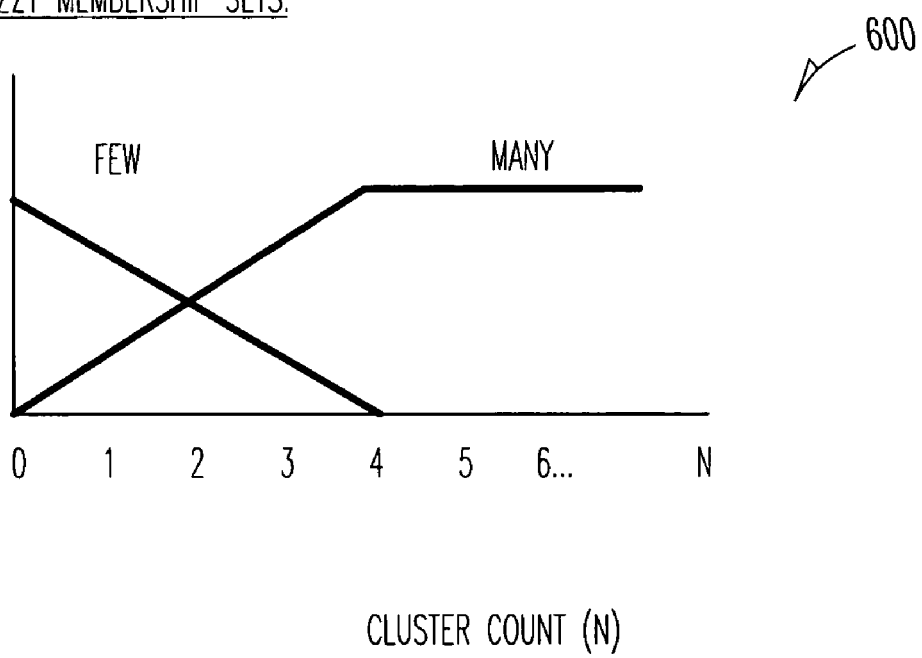
Figure 6B:
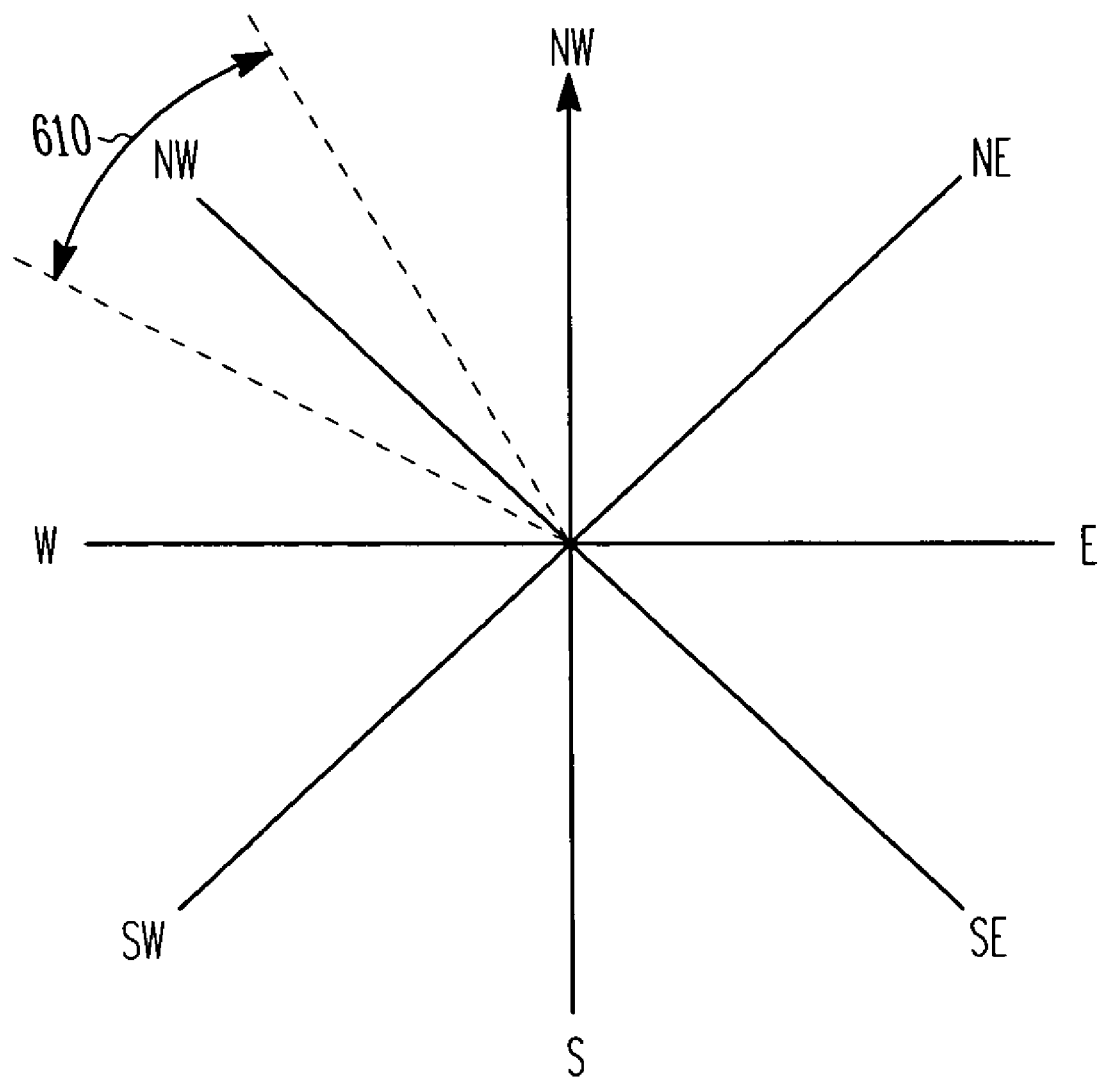
FIG. 6B illustrates an example of directions that may be selected for computing feature vectors in accordance with some embodiments of the present invention.

Operation 306 comprises computing a cluster count feature vector (N). FIG. 6 illustrates a cluster count feature vector (N) in accordance with some embodiments of the present invention. In some embodiments, a cluster count feature vector (N) may be computed by summing a number of the track clusters 602 in each of a plurality of two or more dimensional directions with respect to cluster under test 604. FIG. 6B illustrates an example of directions that may be selected for computing features, although the scope of the invention is not limited in this respect. In operation 306, the number of clusters in directional section 610 may be computed. In some embodiments, a lesser or greater number of directional sections 610 may be used than that illustrated in FIG. 6B.

In some embodiments, operation 306 may also comprise generating fuzzy membership rating 600 (for example, "few" or "many") based on a value of the cluster count feature vector (N) in a particular direction. For example, if the cluster count feature vector is below a predetermined value, a rating of "few" may be given to a particular direction, and when the cluster count feature vector is greater than or equal to a predetermined value, a rating of "many" may be given to a particular direction for each cluster under test. This may allow the human skill of determining a number of clusters in each direction to be quantified.

In some embodiments, operations 306-314 may be performed for each tracked cluster generated from clustering the interceptor-based tracked objects as a cluster under test. In some embodiments, operations 306-314 may also be preformed for the cluster of interest (i.e., the cluster that includes the track of interest provided by the ground-based sensor) as the cluster under test.

Figure 7:
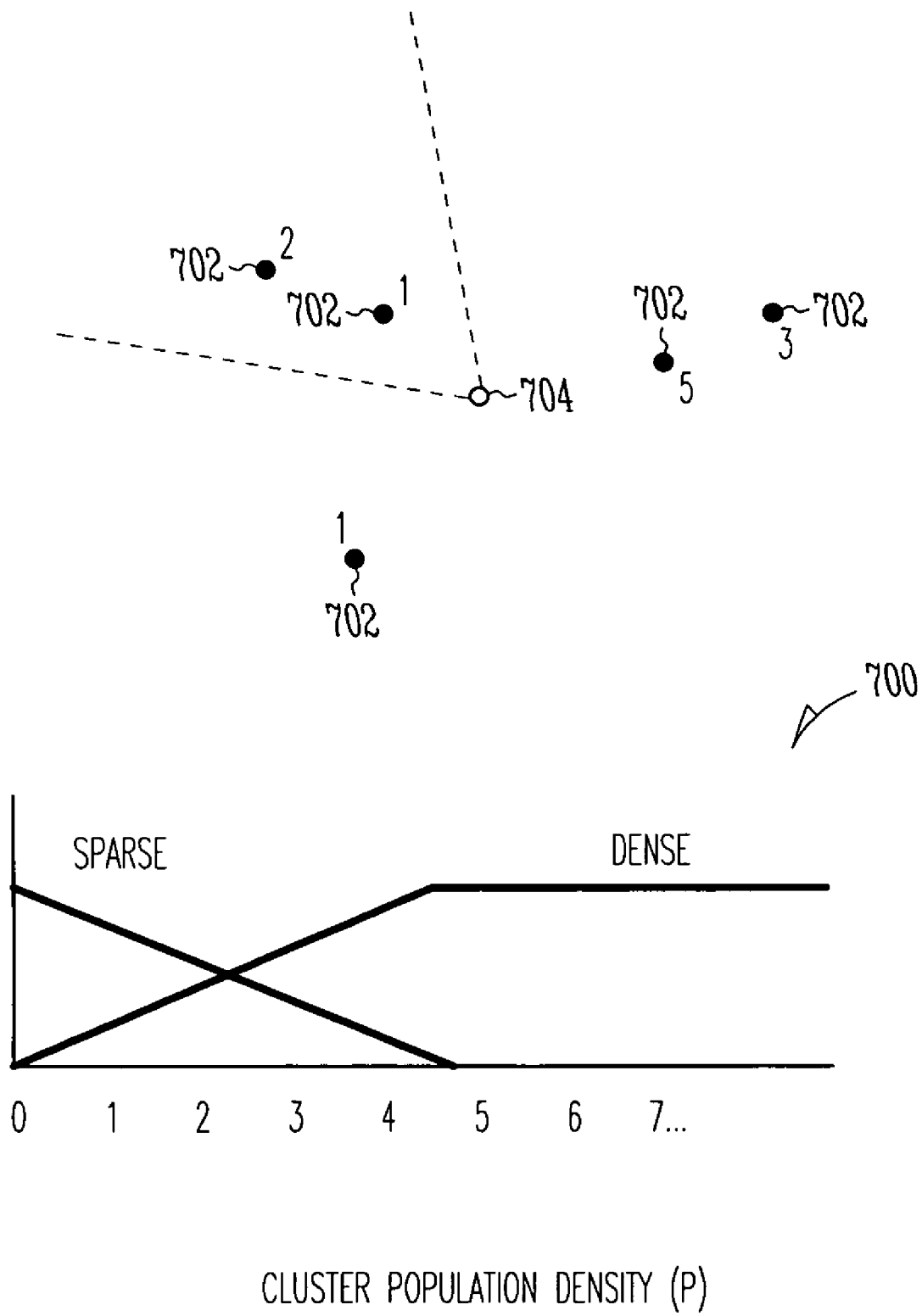
FIG. 7 illustrates a cluster population density feature vector (P) in accordance with some embodiments of the present invention.

Operation 308 comprises computing a cluster population density feature vector (P). FIG. 7 illustrates a cluster population density feature vector (P) in accordance with some embodiments of the present invention. In some embodiments, operation 308 may compute the cluster population density feature vector (P) based on dividing a sum of the populations of track clusters 702 in a direction with respect to cluster under test 704 by the total number of track-clusters. In some embodiments, operation 308 may also comprise generating a fuzzy membership rating 700 (for example, "sparse" or "dense") based on the value of the cluster population density feature vector (P) in a particular direction. The value next to each cluster 702 illustrated in FIG. 7 may correspond to the number of tracks (i.e., population) in each cluster. In some embodiments, the equation below may be used to calculate the cluster population density feature vector (P), although the scope of the invention is not limited in this respect.

$$P = \Sigma n_i / N \text{ for } i=1 \text{ to } N$$

In this equation, $n_i$ may represent the population of the i-th cluster and N may represent the total number of clusters. In some embodiments, when the cluster population density feature vector (P) is below a predetermined value, a rating of "sparse" may be given to a particular direction, and when the cluster population density feature vector (P) is greater than or equal to a predetermined value, a rating of "dense" may be given to a particular direction for each cluster under test, although the scope of the invention is not limited in this respect. This may allow the human skill of determining whether a low-density of clusters is located in a particular direction or whether a high-density of clusters is located in a particular direction to be quantified.

Figure 8:
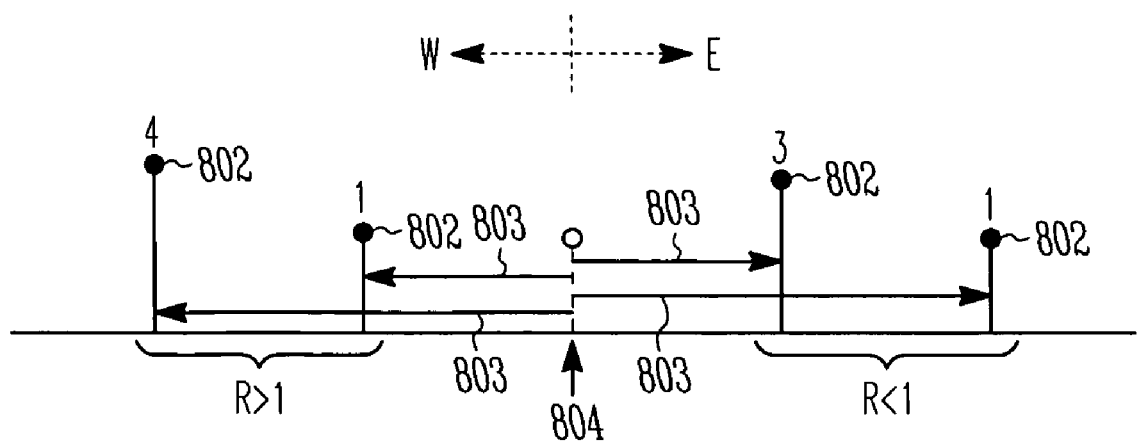
FIG. 8 illustrates a cluster proximity feature vector (r) in accordance with some embodiments of the present invention.
Figure 8:
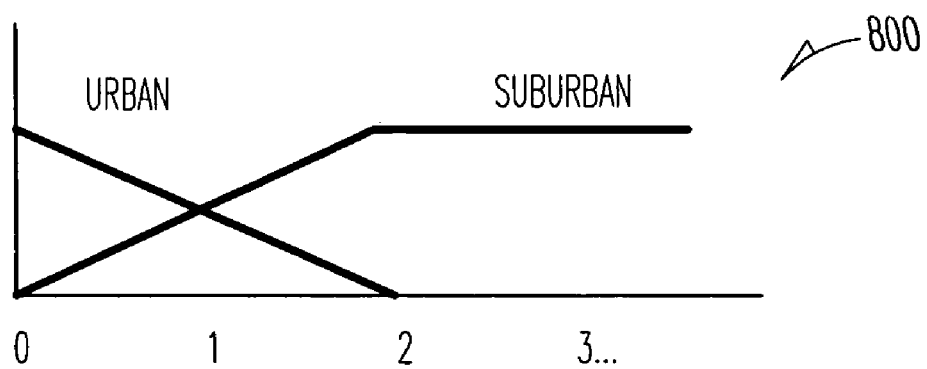

Operation 310 comprises computing a cluster-proximity feature vector (r). FIG. 8 illustrates a cluster proximity feature vector (r) in accordance with some embodiments of the present invention. In some embodiments, operation 310 may compute the cluster proximity feature vector (r) based on a population-weighted radial distance 803 to track clusters 802 for a particular direction with respect to cluster under test 804. In some embodiments, operation 310 may also comprise generating fuzzy membership rating 800 (for example, "urban" or "suburban") based on a value of the cluster proximity feature vector (r) in a particular direction. In some embodiments, the equation below may be used to calculate the cluster proximity feature vector (r), although the scope of the invention is not limited in this respect.

$$r = (\Sigma d_i \cdot n_i / \Sigma n_i) / \Sigma n_i / N \text{ for } i=1 \text{ to } N$$

In this equation, $n_i$ represents the population of the i-th cluster, $d_i$ represents the radial distance to the i-th cluster from the cluster under test, and N may represent the total number of clusters. For example, if the cluster proximity feature vector (r) is below a predetermined value, a rating of "suburban" may be given to a particular direction, and when the cluster proximity feature vector (r) is greater than or equal to a predetermined value, a rating of "urban" may be given to a particular direction for each cluster under test. This may allow the human skill of determining whether a high-density of clusters are located in a particular direction closer-in to the cluster of interest (e.g., urban) or further out from the cluster of interest (e.g., suburban) to be quantified. For example, cluster proximity feature vector (r) may indicate that a high-density population is located far to the West while populous clusters are close-in to the East.

Figure 9:
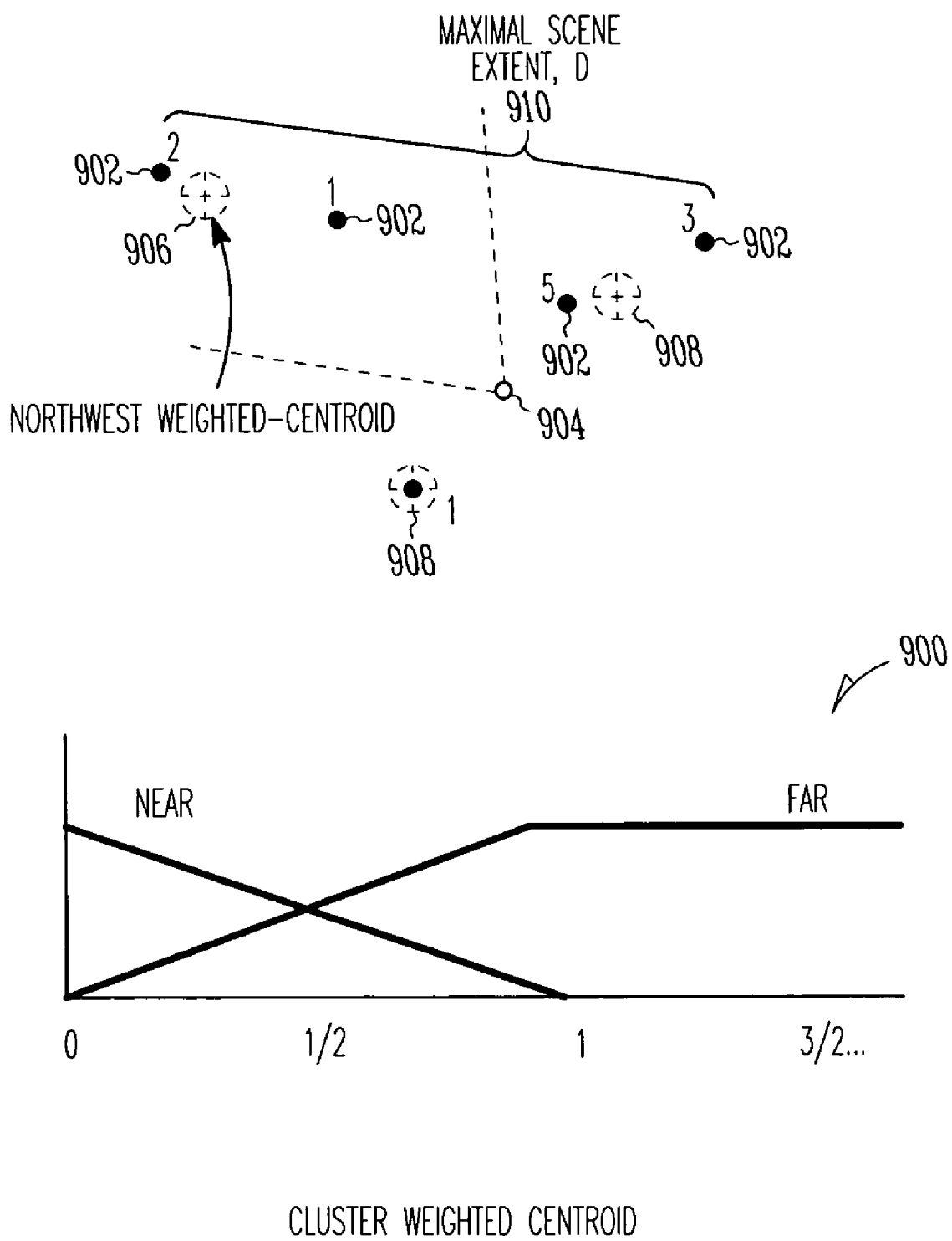
FIG. 9 illustrates a cluster-weighted centroid feature vector (L) in accordance with some embodiments of the present invention.

Operation 312 comprises computing a cluster-weighted centroid feature vector (L). FIG. 9 illustrates a cluster-weighted centroid feature vector (L) in accordance with some embodiments of the present invention. In some embodiments, operation 312 may compute cluster-weighted centroid feature vector (L) based on a population-weighted mean in a particular direction with respect to cluster under test 904 divided by maximal scene extent distance 910. Cluster-weighted centroid 906 is illustrated as an example of a cluster-weighted centroid for the Northwest direction, and cluster-weighted centroid 908 is illustrated as an example of a cluster-weighted centroid for the Northeast direction. Clusters 902 may be weighted based on their population which is illustrated in FIG. 9 as the value next to the cluster. In some embodiments, operation 312 may also comprise generating fuzzy membership rating 900 (for example, "near" or "far") based on a value of the cluster-weighted centroid feature vector (L) in a particular direction. In some embodiments, the equation below may be used to calculate the cluster-weighted centroid feature vector (L), although the scope of the invention is not limited in this respect.

$$L = (\Sigma d_i \cdot n_i / \Sigma n_i) / D \text{ for } i=1 \text{ to } N$$

In this equation, $n_i$ represents the population of the i-th cluster, $d_i$ represents the radial distance to the i-th cluster from the cluster under test, D may represent maximal scene extent 908, and N may represent the total number of clusters. For example, if the cluster-weighted centroid feature vector (L) is below a predetermined value, a rating of "near" may be given to a particular direction, and when the cluster-weighted centroid feature vector (L) is greater than or equal to a predetermined value, a rating of "far" may be given to a particular direction for each cluster under test. This may allow the human skill of determining the relation of the weighted centroid of clusters to the total scene extent to be quantified. For example, relative to the cluster under test, the weighted centroid of clusters in the Northwest may be about ¾ of the total scene extent, while the weighted centroid of clusters in the Northeast direction may be about ⅓ the total scene extent.

Figure 10:
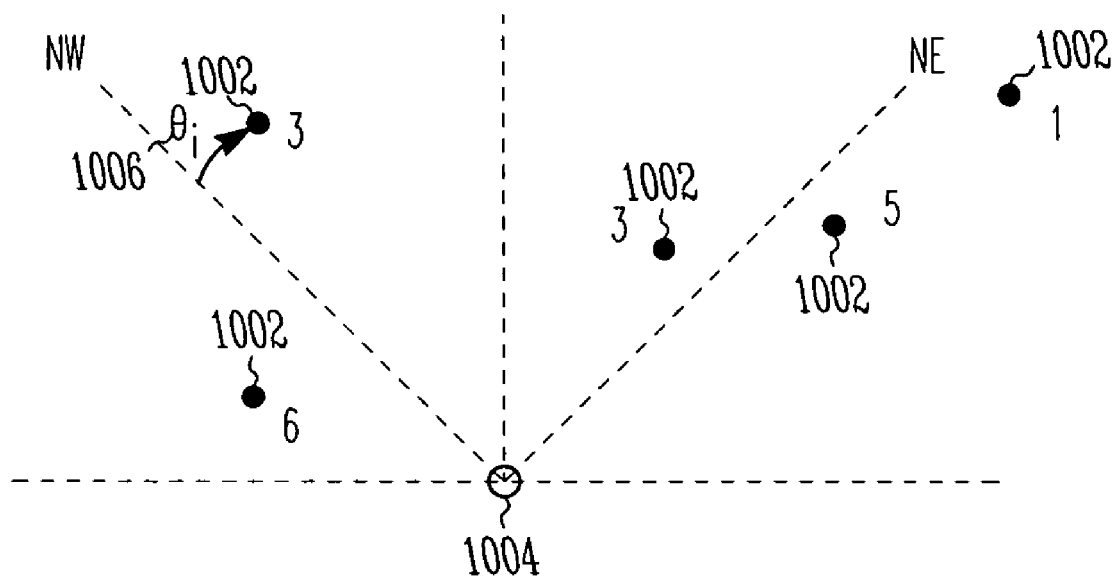
FIG. 10 illustrates a cluster scattering feature vector ($\theta$) in accordance with some embodiments of the present invention.
Figure 10:
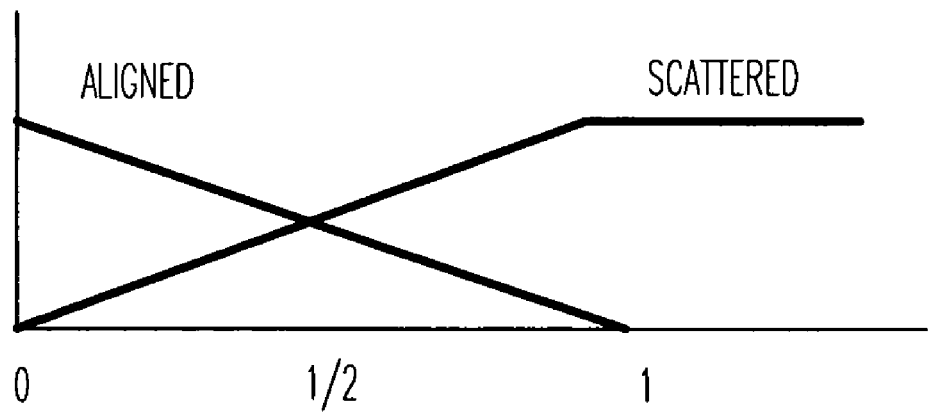

Operation 314 comprises computing a cluster scattering feature vector ($\theta$). FIG. 10 illustrates a cluster scattering feature vector ($\theta$) in accordance with some embodiments of the present invention. In some embodiments, operation 314 may compute cluster scattering feature vector ($\theta$) based on angular deviation 1006 of clusters 1002 in a particular direction with respect to cluster of interest 1004. In some embodiments, operation 314 may generate a fuzzy membership rating 1000 (for example, "scattered" or "aligned") based on a value of the cluster scattering feature vector ($\theta$) in the particular direction. In some embodiments, the equation below may be used to calculate the cluster scattering feature vector ($\theta$), although the scope of the invention is not limited in this respect.

$$\theta = (\Sigma \theta_i \cdot n_i / \Sigma n_i) / (\pi/4) \text{ for } i=1 \text{ to } N$$

In this equation, $n_i$ represents the population of the i-th cluster, $\theta_i$ may represent the angle to the i-th cluster from the particular direction, $\pi/4$ may represent half of the directional subtense and may be based on the number of directions being used, and N may represent the total number of clusters. For example, if the cluster scattering feature vector ($\theta$) is below a predetermined value, a rating of "aligned" may be given to a particular direction, and when the cluster scattering feature vector ($\theta$) is greater than or equal to a predetermined value, a rating of "scattered" may be given to a particular direction for each cluster under test. This may allow the human skill of determining whether the clusters are scattered or aligned in a particular direction to be quantified. For example, the cluster scattering feature vector ($\theta$) may indicate that the clusters are scattered in the Northwest and that the clusters are aligned in the Northeast, as illustrated in FIG. 10.

Although fuzzy membership ratings are given descriptive terms herein, the scope of the invention is not limited in this respect. In some embodiments, the ratings may be given actual values that may be associated with each rating.

Figure 11:
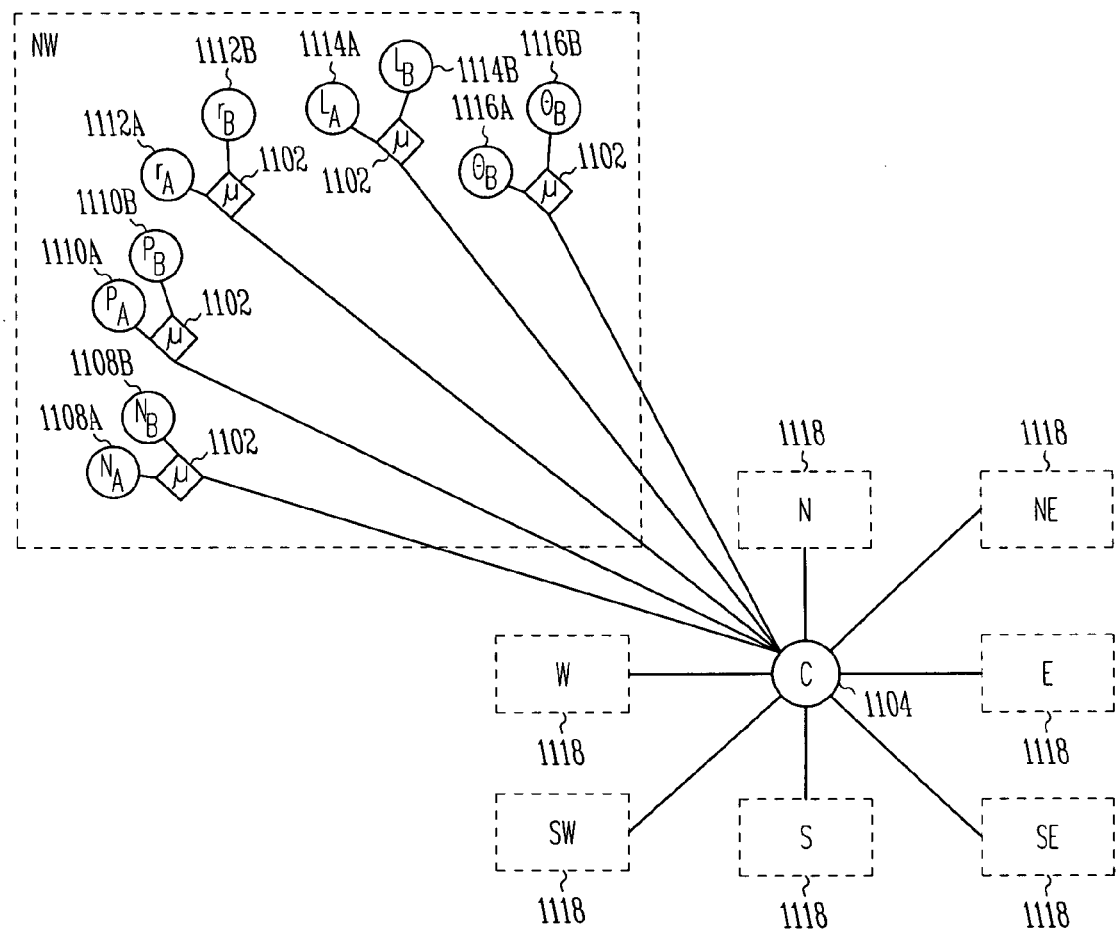
FIG. 11 illustrates the generation of belief functions ($\mu$) in accordance with some embodiments of the present invention.

Operation 316 comprises computing belief functions ($\mu$). FIG. 11 illustrates the generation of belief functions ($\mu$) in accordance with some embodiments of the present invention. In some embodiments, belief functions 1102 may be computed for corresponding features for each direction 1118 with respect to each cluster under test 1104. In some embodiments, belief functions ($\mu$) 1102 may define a relational probability assignment (i.e., a rule) between each feature and an association class.

For example, cluster count feature vector (N) 1108A computed in operation 306 from a ground-based sensor and cluster count feature vector (N) 1108B computed in operation 306 from an interceptor-based sensor may be used to generate a first belief function. Cluster population density feature vector (P) 1110A computed in operation 308 from a ground-based sensor and cluster population density feature vector (P) 1110B computed in operation 308 from an interceptor-based sensor may be used to generate a second belief function. Cluster proximity feature vector (r) 1112A computed in operation 310 from a ground-based sensor and cluster proximity feature vector (r) 1112B computed in operation 310 from an interceptor-based sensor may be used to generate a third belief function. Cluster-weighted centroid feature vector (L) 1114A computed in operation 312 from a ground-based sensor and cluster-weighted centroid feature vector (L) 1114B computed in operation 312 from an interceptor-based sensor may be used to generate a fourth belief function. Cluster scattering feature vector ($\theta$) 1116A computed in operation 314 from a ground-based sensor and cluster scattering feature vector ($\theta$) 1116B computed in operation 314 from an interceptor-based sensor may be used to generate a fifth belief function.

In some embodiments, the belief functions may be generated based on rules and the fuzzy membership ratings discussed in more detail below.

Operation 318 comprises fusing belief functions 1102. In some embodiments, all belief functions 1102 from each particular direction and all features with respect to cluster under test 1104 may be fused, although the scope of the invention is not limited in this respect.

Operation 320 comprises selecting a cluster with the highest likelihood of being the cluster of interest (i.e., having the track of interest identified by the ground-based tracking sensor). In some embodiments, for each feature, operation 320 may determine whether the belief or likelihood of association is to be increased or decreased with respect to a cluster under test and the cluster of interest.

For example, for the cluster count feature vector (N) when a "few" rating is generated from both a cluster from the ground-based sensor and the interceptor based sensor, then the belief or likelihood of association is increased. When a "many" rating is generated from both a cluster from the ground-based sensor and the interceptor based sensor, then the belief or likelihood of association is increased. When a "few" rating is generated from a cluster from the ground-based sensor and a "many" rating is generated for a cluster from the interceptor based sensor, then the belief or likelihood of association is decreased. Likewise, when a "many" rating is generated from a cluster from the ground-based sensor and a "few" rating is generated for a cluster from the interceptor based sensor, then the belief or likelihood of association is decreased. The increase or decrease of belief or likelihood of association may be assigned a predetermined value, which may depend on the particular belief function.

For example, for the cluster population density feature vector (P), when a "sparse" rating is generated from both a cluster from the ground-based sensor and the interceptor based sensor, then the belief or likelihood of association is increased. When a "dense" rating is generated from both a cluster from the ground-based sensor and the interceptor based sensor, then the belief or likelihood of association is increased. When a "sparse" rating is generated from a cluster from the ground-based sensor and a "dense" rating is generated for a cluster from the interceptor based sensor, then the belief or likelihood of association is decreased. Likewise, when a "dense" rating is generated from a cluster from the ground-based sensor and a "sparse" rating is generated for a cluster from the interceptor based sensor, then the belief or likelihood of association is decreased. The increase or decrease of belief or likelihood of association may be assigned a predetermined value, which may depend on the particular belief function.

For example, for the cluster proximity feature vector (r), when a "suburban" rating is generated from both a cluster from the ground-based sensor and the interceptor based sensor, then the belief or likelihood of association is increased. When an "urban" rating is generated from both a cluster from the ground-based sensor and the interceptor based sensor, then the belief or likelihood of association is increased. When a "suburban" rating is generated from a cluster from the ground-based sensor and an "urban" rating is generated for a cluster from the interceptor based sensor, then the belief or likelihood of association is decreased. Likewise, when an "urban" rating is generated from a cluster from the ground-based sensor and a "suburban" rating is generated for a cluster from the interceptor based sensor, then the belief or likelihood of association is decreased. The increase or decrease of belief or likelihood of association may be assigned a predetermined value, which may depend on the particular belief function.

For example, for the cluster-weighted centroid feature vector (L), when a "far" rating is generated from both a cluster from the ground-based sensor and the interceptor based sensor, then the belief or likelihood of association is increased. When a "near" rating is generated from both a cluster from the ground-based sensor and the interceptor based sensor, then the belief or likelihood of association is increased. When a "far" rating is generated from a cluster from the ground-based sensor and a "near" rating is generated for a cluster from the interceptor based sensor, then the belief or likelihood of association is decreased. Likewise, when a "near" rating is generated from a cluster from the ground-based sensor and a "far" rating is generated for a cluster from the interceptor based sensor, then the belief or likelihood of association is decreased. The increase or decrease of belief or likelihood of association may be assigned a predetermined value, which may depend on the particular belief function.

For example, for the cluster scattering feature vector ($\theta$), when a "scattered" rating is generated from both a cluster from the ground-based sensor and the interceptor based sensor, then the belief or likelihood of association is increased. When an "aligned" rating is generated from both a cluster from the ground-based sensor and the interceptor based sensor, then the belief or likelihood of association is increased. When a "scattered" rating is generated from a cluster from the ground-based sensor and an "aligned" rating is generated for a cluster from the interceptor based sensor, then the belief or likelihood of association is decreased. Likewise, when an "aligned" rating is generated from a cluster from the ground-based sensor and a "scattered" rating is generated for a cluster from the interceptor based sensor, then the belief or likelihood of association is decreased. The increase or decrease of belief or likelihood of association may be assigned a predetermined value, which may depend on the particular belief function.

Operation 320 may combine the predetermined values generated from either the increase or decrease of belief or likelihood of association for each of the features to select a cluster with the highest likelihood. The cluster selected in operation 320 may be used by the interceptor as the track of interest to intercept a target, although using the selected cluster is not a requirement. For example, if the likelihood of the selected cluster is not much higher than other tracks, the interceptor may use other on-board data for selecting the target, including infrared/optical sensor data, among other things, to make a decision for intercept. Once a tracked object is identified for intercept, the interceptor may adjust its guidance system to intercept and destroy the object.

Although the individual operations of procedure 300 are illustrated and described as separate operations, one or more of the individual operations may be performed concurrently, and nothing requires that the operations be performed in the order illustrated.

FIG. 12 illustrates the contribution of feature vectors to a correlation function in accordance with some embodiments of the present invention. Table 1200 illustrates values of feature vectors 1202 in column 1204 and the correlation property in column 1206. Table 1200 also illustrates whether or not a particular feature contributes to likelihood of association in column 1208 for a particular cluster under test. This illustrates the behavior of a pattern classification procedure in accordance with some embodiments of the present invention for a simplified example of clusters having a population of one in which no clustering occurs. Feature vectors identified as contributing to the likelihood (indicated by a Y (or yes) in column 1208) may comprise a summary of the correlation function for this simplified example.

Figure 13A:
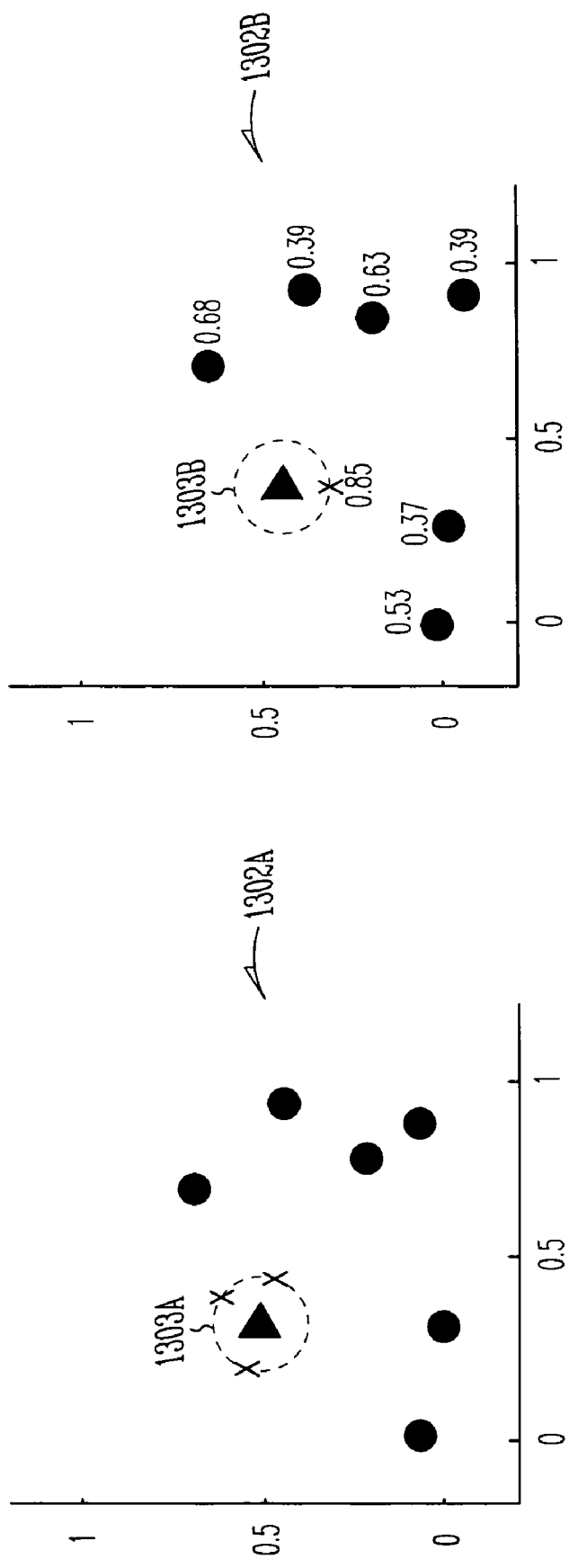
FIGS. 13A, 13B and 13C illustrate examples of association between clusters in accordance with some embodiments of the present invention.
Figure 13B:
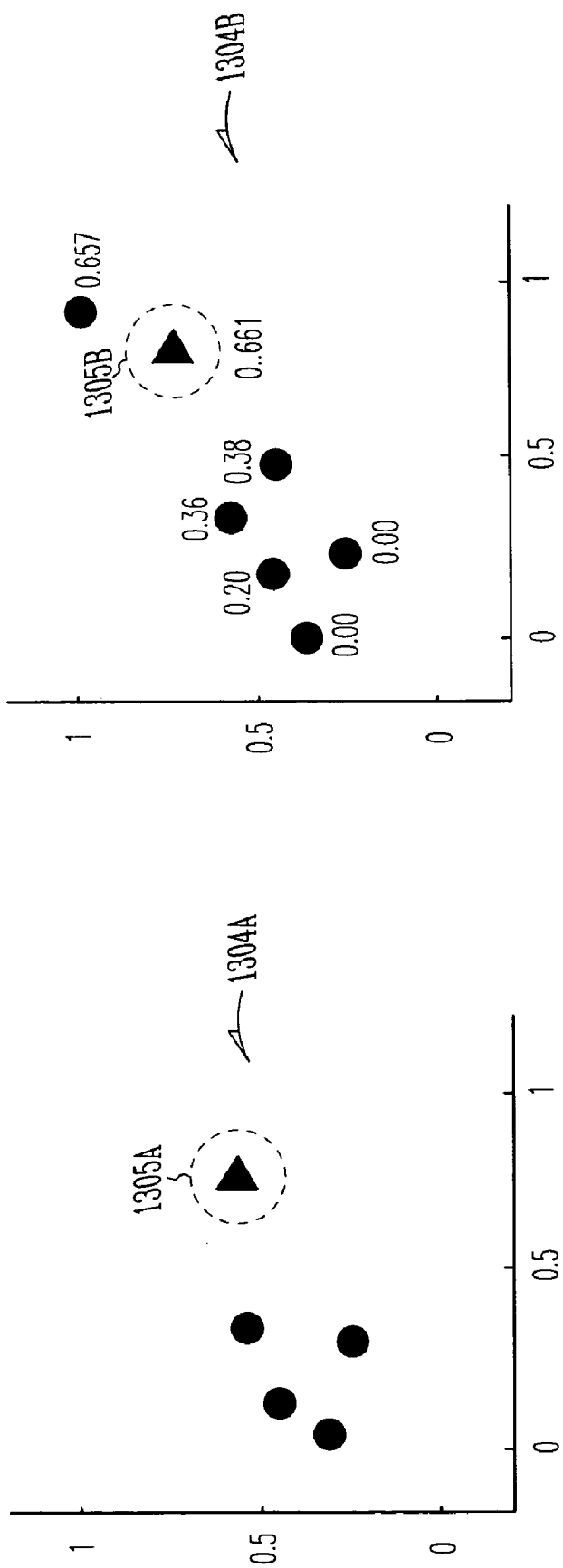
Figure 13C:
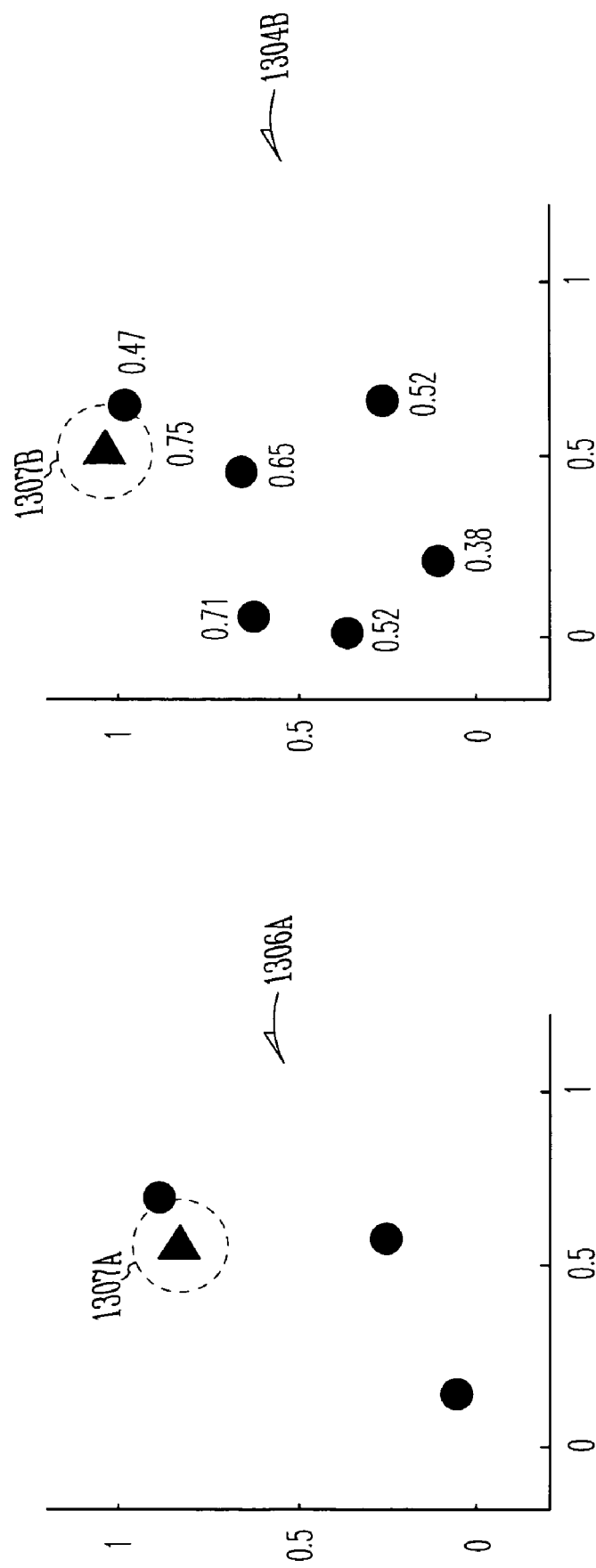

FIGS. 13A, 13B and 13C illustrate examples of association between clusters in accordance with some embodiments of the present invention. FIG. 13A illustrates tracked objects by a ground-based sensor and an interceptor-based sensor with maximal scene information. In this example, the likelihoods of association between tracked objects 1302A from a ground-based sensor and tracked objects 1302B from an interceptor-based sensor are indicated by the values next to tracked objects 1302B. Maximum likelihood track 1303B is illustrated as having the greatest association value and may correspond to track of interest 1303A.

FIG. 13B illustrates tracked objects by a ground-based sensor and an interceptor-based sensor with closely-spaced objects. In this example, closely spaced objects are given almost equal likelihood of association. In this example, the likelihoods of association between tracked objects 1304A from a ground-based sensor and tracked objects 1304B from an interceptor-based sensor are indicated by the values next to tracked objects 1304B. Maximum likelihood track 1305B is illustrated as having the greatest association value and may correspond to track of interest 1305A.

FIG. 13C illustrates tracked objects by a ground-based sensor and an interceptor illustrating an underlying pattern discovered in the presence of scene mismatch. In this example, the likelihoods of association between tracked objects 1306A from a ground-based sensor and tracked objects 1306B from an interceptor-based sensor are indicated by the values next to tracked objects 1306B. Maximum likelihood track 1307B is illustrated as having the greatest association value and may correspond to track of interest 1307A.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. An interceptor-based sensor comprising:
   a track clustering element to cluster tracks of objects to generate track clusters based on an uncertainty associated with each track;
   a feature generating element to generate feature vectors for the track clusters in one or more directions with respect to a cluster under test, the feature vectors comprising one or more of a cluster count feature vector (N), a cluster population density feature vector (P), a cluster proximity feature vector (r), a cluster-weighted centroid feature vector (L) and a cluster scattering feature vector ($\theta$); and
   a track selection element to associate tracks provided by another sensor based on belief functions generated from the feature vectors, the track selection element to select one of the tracks corresponding to a track of interest.

2. The sensor of claim 1 wherein the track selection element is to generate the belief functions (μ) from corresponding feature vectors of both sensors for each of a plurality of cluster as clusters-under-test, and wherein the track selection element is to assign an association class based on the belief functions and a plurality of ratings for selection of a track cluster having a high-probability of including the track of interest.

3. The sensor of claim 1 further comprising a track state estimation element to generate a track-state vector for each of plurality of the objects detected within a threat object cloud, the objects being detected by on-board sensor circuitry of the sensor, each track-state vector comprising velocity, position and the uncertainty, wherein the track clustering element is to cluster the tracks based associated track-state vectors having overlapping uncertainty regions, the uncertainty regions based on the covariance associated with each track-state vector.

4. The sensor of claim 3 wherein the other sensor is a ground-based tracking sensor, and wherein radar tracks of a plurality of radar-tracked objects are received from the ground based sensor, and wherein one of the radar-tracks is designated as the track of interest by the ground-based tracking sensor, wherein the track clustering element is to further cluster the radar-tracks of the radar-tracked objects having overlapping uncertainty regions with the track of interest to generate a track-cluster of interest, and wherein the feature generating element is to further generate feature vectors for the track-cluster of interest in two or more dimensional directions with respect to the track of interest.

5. The sensor of claim 4 further comprising coordinate transform processing element to transform a multi-dimensional threat-object map (TOM) provided by the ground-based tracking sensor to a two-dimensional threat-object map (TOM) comprising the radar tracks, wherein each radar-track comprises at least velocity, position and uncertainty information.

6. The sensor of claim 2 wherein the feature generating element computes the cluster count feature vector (N) by summing a number of the track clusters in each of a plurality of two or more dimensional directions with respect to the cluster under test, and wherein the feature generating element generates a rating corresponding to either few or many based on a value of the cluster count feature vector (N) in a particular direction.

7. The sensor of claim 2 wherein the feature generating element computes the cluster population density feature vector (P) based on dividing a sum of a number of track clusters in a direction by a total number of track-clusters, and wherein the feature generating element generates a rating corresponding to either sparse or dense based on the value of the cluster population density feature vector (P) in a particular direction.

8. The sensor of claim 2 wherein the feature generating element computes the cluster proximity feature vector (r) based on a population-weighted radial distance to the track clusters for a particular direction, and wherein the feature generating element generates a rating corresponding to either urban or suburban based on a value of the cluster proximity feature vector (r) in a particular direction.

9. The sensor of claim 2 wherein the feature generating element computes the cluster-weighted centroid feature vector (L) based on a population-weighted mean in a particular direction divided by a maximal scene extent distance, and wherein the feature generating element generates a rating corresponding to either near or far based on a value of the cluster-weighted centroid feature vector (L) in a particular direction.

10. The sensor of claim 2 wherein the feature generating element computes the cluster scattering feature vector (θ) based on an angular deviation of the clusters with respect to a particular direction, and wherein the feature generating element generates a rating corresponding to either scattered or aligned based on a value of the cluster scattering feature vector (θ) in the particular direction.

11. The sensor of claim 1 wherein the track clustering element, the feature generating element, and the track selection element operate on one or more processors.

12. The sensor of claim 1 wherein the track selection element is to select the track of interest for intercept of a corresponding object within a threat object cloud.

13. A method of associating tracks from different sensors comprising:

clustering tracks of objects to generate track clusters based on an uncertainty associated with each track;

generating feature vectors for the track clusters in one or more directions with respect to a cluster under test, the feature vectors comprising one or more of a cluster count feature vector (N), a cluster population density feature vector (P), a cluster proximity feature vector (r), a cluster-weighted centroid feature vector (L) and a cluster scattering feature vector (θ);

associating tracks provided by another sensor based on belief functions generated from the feature vectors; and selecting one of the tracks corresponding to a track of interest.

14. The method of claim 13 further comprising:

generating the belief functions (μ) from corresponding feature vectors of both sensors for each of a plurality of cluster as clusters-under-test; and assigning an association class based on the belief functions and a plurality of ratings for selection of a track cluster having a high-probability of including the track of interest.

15. The method of claim 13 further comprising:

generating a track-state vector for each of plurality of the objects detected within a threat object cloud, the objects being detected by on-board sensor circuitry of the sensor, each track-state vector comprising velocity, position and the uncertainty, and wherein clustering comprises clustering the tracks based associated track-state vectors having overlapping uncertainty regions, the uncertainty regions based on the covariance associated with each track-state vector.

16. The method of claim 15 wherein the other sensor is a ground-based tracking sensor, and wherein radar tracks of a plurality of radar-tracked objects are received from the ground based sensor, wherein one of the radar-tracks is designated as the track of interest by the ground-based tracking sensor, and wherein the method further comprises:

clustering the radar-tracks of the radar-tracked objects having overlapping uncertainty regions with the track of interest to generate a track-cluster of interest; and generating feature vectors for the track-cluster of interest in two or more dimensional directions with respect to the track of interest.

17. The method of claim 16 further comprising transforming a multi-dimensional threat-object map (TOM) provided by the ground-based tracking sensor to a two-dimensional threat-object map (TOM) comprising the radar tracks, wherein each radar-track comprises at least velocity, position and uncertainty information.

18. The method of claim 14 further comprising:
computing the cluster count feature vector (N) by summing a number of the track clusters in each of a plurality of two or more dimensional directions with respect to the cluster under test; and
generating a rating corresponding to either few or many based on a value of the cluster count feature vector (N) in a particular direction.

19. The method of claim 14 further comprising:
computing the cluster population density feature vector (P) based on dividing a sum of a number of track clusters in a direction by a total number of track-clusters; and
generating a rating corresponding to either sparse or dense based on the value of the cluster population density feature vector (P) in a particular direction.

20. The method of claim 14 further comprising:
computing the cluster proximity feature vector (r) based on a population-weighted radial distance to the track clusters for a particular direction; and
generating a rating corresponding to either urban or suburban based on a value of the cluster proximity feature vector (r) in a particular direction.

21. The method of claim 14 further comprising:
computing the cluster-weighted centroid feature vector (L) based on a population-weighted mean in a particular direction divided by a maximal scene extent distance; and
generating a rating corresponding to either near or far based on a value of the cluster-weighted centroid feature vector (L) in a particular direction.

22. The method of claim 14 further comprising:
computing the cluster scattering feature vector ($\theta$) based on an angular deviation of the clusters with respect to a particular direction; and
generating a rating corresponding to either scattered or aligned based on a value of the cluster scattering feature vector ($\theta$) in the particular direction.

23. The method of claim 13 wherein the clustering, the feature generating and the track selecting are performed by one or more processors.

24. The method of claim 13 wherein selecting comprises selecting the track of interest for intercept of a corresponding object within a threat object cloud.

25. A pattern classifier comprising:
a track clustering element to cluster tracks of objects provided by a first sensor to generate track clusters based on an uncertainty associated with each track;
a feature generating element to generate feature vectors for the track clusters in one or more directions with respect to a cluster under test, the feature vectors comprising one or more of a cluster count feature vector (N), a cluster population density feature vector (P), a cluster proximity feature vector (r), a cluster-weighted centroid feature vector (L) and a cluster scattering feature vector ($\theta$); and
a track selection element to associate tracks provided by a second sensor (204) based on belief functions generated from the feature vectors, the track selection element to select one of the tracks corresponding to a track of interest.

26. The pattern classifier of claim 25 wherein the track selection element is to generate the belief functions ($\mu$) from corresponding feature vectors of both sensors for each of a plurality of cluster as clusters-under-test, and
wherein the track selection element is to assign an association class based on the belief functions and a plurality of ratings for selection of a track cluster having a high-probability of including the track of interest.

27. The pattern classifier of claim 25 further comprising a track state estimation element to generate a track-state vector for each of plurality of the objects detected by the first sensor, each track-state vector comprising velocity, position and the uncertainty,
wherein the track clustering element is to cluster the tracks based associated track-state vectors having overlapping uncertainty regions, the uncertainty regions based on the covariance associated with each track-state vector.

28. A missile-defense system comprising:
a ground-based sensor to acquire a threat cloud comprising a missile from a track-state estimate and covariance provided by an overhead sensor; and
an interceptor to receive track-state vectors of objects in the threat cloud tracked by the ground-based sensor,
the interceptor comprising a track clustering element to cluster tracks of objects to generate track clusters based on an uncertainty associated with each track, a feature generating element to generate feature vectors for the track clusters in one or more directions with respect to a cluster under test, and a track selection element to associate tracks provided by another sensor based on belief functions generated from the feature vectors, the track selection element to select one of the tracks corresponding to a track of interest,
wherein the feature vectors comprise one or more of a cluster count feature vector (N), a cluster population density feature vector (P), a cluster proximity feature vector (r), a cluster-weighted centroid feature vector (L) and a cluster scattering feature vector ($\theta$).

29. The system of claim 28 wherein the overhead sensor comprises a satellite to detect a launch of the missile and to track a plume of the missile through burnout.

30. The system of claim 28 wherein the track selection element is to generate the belief functions ($\mu$) from corresponding feature vectors of both sensors for each of a plurality of cluster as clusters-under-test, and
wherein the track selection element is to assign an association class based on the belief functions and a plurality of ratings for selection of a track cluster having a high-probability of including the track of interest.

31. The system of claim 30 wherein the interceptor further comprises a track state estimation element to generate a track-state vector for each of plurality of the objects detected within a threat object cloud, the objects being detected by on-board sensor circuitry of the sensor, each track-state vector comprising velocity, position and the uncertainty,
wherein the track clustering element is to cluster the tracks based associated track-state vectors having overlapping uncertainty regions, the uncertainty regions based on the covariance associated with each track-state vector, wherein the other sensor is a ground-based tracking sensor, and wherein radar tracks of a plurality of radar-tracked objects are received from the ground based sensor, wherein one of the radar-tracks is designated as the track of interest by the ground-based tracking sensor, wherein the track clustering element is to further cluster the radar-tracks of the radar-tracked objects having overlapping uncertainty regions with the track of interest to generate a track-cluster of interest, and wherein the feature generating element is to further generate feature vectors for the track-cluster of interest in two or more dimensional directions with respect to the track of interest.

32. A machine-accessible medium that provides instructions, which when accessed, cause a machine to perform operations comprising:

clustering tracks of objects to generate track clusters based on an uncertainty associated with each track;

generating feature vectors for the track clusters in one or more directions with respect to a cluster under test, the feature vectors comprising one or more of a cluster count feature vector (N), a cluster population density feature vector (P), a cluster proximity feature vector (r), a cluster-weighted centroid feature vector (L) and a cluster scattering feature vector ($\theta$);

associating tracks provided by another sensor based on belief functions generated from the feature vectors; and selecting one of the tracks corresponding to a track of interest.

* * * * *